E. COLEMAN.
Wheel-Tire.
No. 57,092.  Patented Aug. 14, 1866.
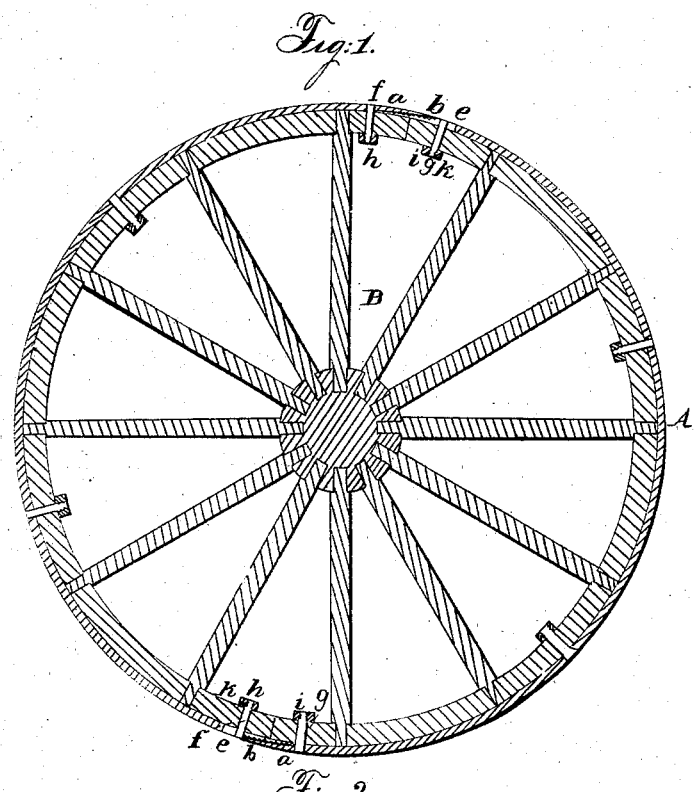
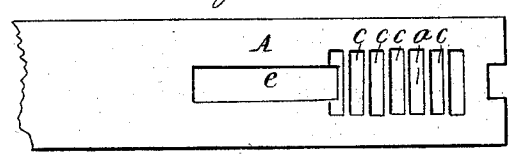
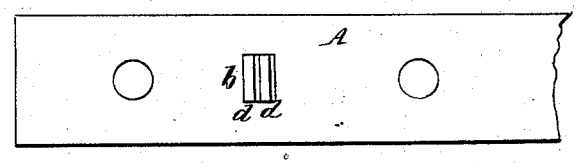
Witnesses
Samuel N. Piper
George Andrews
Inventor
Ebenezer Coleman
by his attorney
R. H. Eddy

UNITED STATES PATENT OFFICE.

EBENEZER COLEMAN, OF WOBURN, MASSACHUSETTS.

IMPROVEMENT IN WHEEL-TIRES.

Specification forming part of Letters Patent No. 57,092, dated August 14, 1866.

*To all whom it may concern:*

Be it known that I, EBENEZER COLEMAN, of Woburn, in the county of Middlesex and State of Massachusetts, have made a new and useful Improvement in Wheel-Tires; and I do hereby declare the same to be fully described in the following specification and represented in the accompanying drawings, of which—

Figure 1 is a longitudinal section of a wheel and its tire as provided with my invention. Fig. 2 is a top view of the lower lap of the joint of the tire. Fig. 3 is an under-side view of the upper lap.

The tire A is a bar of iron bent around in the form of a hoop and having one end lapped on the other, the laps being shown at $a$ and $b$. The lower lap has a range of notches, $c\ c\ c\ c$, made on its upper surface, to engage with one or more projections or teeth, $d\ d$, extending from the lower surface of the upper lap, $a$. Furthermore, the lower lap has a slot, $e$, made through it near the series of notches. Two screws, $f g$, provided with nuts $h\ i$, go through the upper lap. That one of them which is next to the end of the upper lap also goes through the slot $e$. Both bolts go through the felly $k$ of the wheel B, and hold the tire to it, the nuts being screwed on the bolts where they project beyond the inner circumference of the felly.

By means of the series of notches $c\ c\ c$, the teeth $d\ d$, and the slot $e$, arranged with respect to the laps and their confining-bolts in manner substantially as described, the tire may be tightened or taken up on the felly as occasion may require, the teeth and notches serving to keep the laps from being drawn apart while they are secured to the felly by the bolts.

I claim—

The arrangement and combination of the series of notches $c\ c\ c$ and teeth $d\ d$, or their equivalents, and the slot $e$, with the tire-laps $a\ b$, the same being to operate together, and with a felly and confining-bolts, substantially as specified.

EBEN. COLEMAN.

Witnesses:
R. H. EDDY,
F. P. HALE, Jr.